A. BOSSHARD.
ANTISKIDDING DEVICE FOR VEHICLE WHEELS.
APPLICATION FILED DEC. 30, 1910.
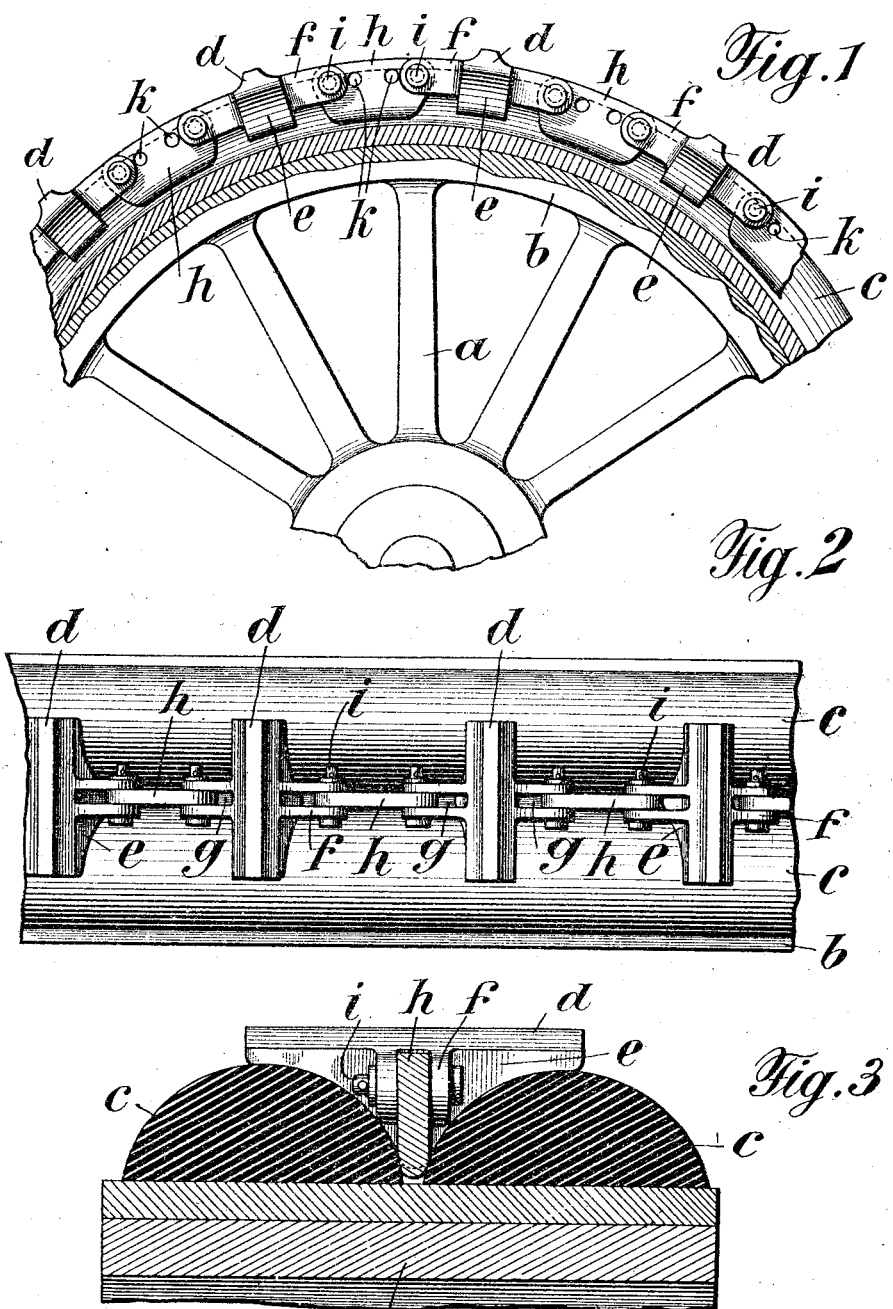

UNITED STATES PATENT OFFICE.

ARNOLD BOSSHARD, OF ARBON, SWITZERLAND.

ANTISKIDDING DEVICE FOR VEHICLE-WHEELS.

1,119,234.  Specification of Letters Patent.  Patented Dec. 1, 1914.

Application filed December 30, 1910. Serial No. 600,162.

*To all whom it may concern:*

Be it known that I, ARNOLD BOSSHARD, a citizen of the Republic of Switzerland, residing at Rebenstrasse, Arbon, Switzerland, have invented certain new and useful Improvements in Antiskidding Devices for Vehicle-Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to anti-skidding devices for vehicle wheels and more particularly to wheels having double tires.

The device is in the form of a chain having transverse projections supported by the double tires. In the chains previously known the parts having the said projections were connected by ordinary chain links of circular cross section. The chains are made so long that they can be put on the wheels without breaking connection between their links. In consequence thereof, part of the chain is displaced from between the two halves of the tire at the hind part of the wheel. This part is not properly kept in line with the other parts of the chain and in consequence it may occur that the links of the chain do not get into their proper position between the halves of the tire, an irregularity which also causes increased wear of the tires. In the improved device the parts having the anti-skid projections are connected by links made of flat pieces which are held in slots in the ends of said pieces by means of pins, so that all the links are kept in line with each other. The flat pieces extend nearly up to the felly of the wheel and are made of such thickness that they are clamped between the parts of the double tire. In order to be able to lengthen or shorten the chain the pins connecting the links are adapted to be detached, and additional holes are made in the connecting links or in the parts having projections or in both through which holes the pins may be put after the chain has been disconnected.

An example of the improved device is shown in the drawing in which—

Figure 1 is an elevation, the nearer half of the dual tire being removed. Fig. 2 a plan view, and Fig. 3 a cross section of the device.

$a$ is a part of a wheel the rim $b$ of which has two rubber tires $c$, $c$ which form a groove into which an endless chain may be inserted, said chain being so long that it can be put on the wheel and into the groove between the tires $c$ without disconnecting it. This chain has T-shaped parts $d$, $e$, the bars $d$ of which are adapted to engage the tires $c$, $c$ while the parts $e$ extend inwardly between the tires. Parts $d$, $e$ have projections $f$ with slots $g$ into which fit the ends of links $h$ which are attached to the parts $d$, $e$ by means of pins $i$. The links $h$ have two more holes $k$ through which the pins $i$ may be passed in order to shorten the chain. The parts $d$ form projections on the tread of the tire which prevent skidding of the same on frozen or slippery roads. The links $h$ extend nearly up to the felly between the parts $c$, $c$ of the tire and are so thick that they are clamped between them. As the chain is so long that it can be put over the tires $c$ and into the groove between them without being disconnected a bend will form in the chain which when the vehicle is running will always be at the hind part of the wheel, hanging slack free of and away from the wheel tire. The links in this bend are no longer guided laterally by the groove between the tires but are still kept in line owing to their being guided in the slots $g$ of parts $d$, $e$, so that the chain is always held in proper position on the wheel. Links $h$ being clamped between parts $c$ cause the chain to be safely held on the wheel.

Having now particularly described and ascertained the nature of the said invention and in what manner the same is to be performed, I declare that what I claim is:

1. An anti-skidding chain for wheels having tires comprising a series of spaced links, each consisting of a bar extending approximately to the center of the said tires, lugs extending inwardly from the said bars, the said lugs being provided with faces conforming to and placed in contact with the adjacent surfaces of said tires, lugs connected to each of the said bars and extending centrally therefrom on both sides longitudinally of the chain, and links the ends of which are placed between and pivotally connected to the said lugs, the thickness of the last aforesaid links being greater than the distance between the said tires at the bases thereof.

2. A non-skid device for double tired wheels comprising a series of frogs provided with perforated ears at each end, hinged together by a series of bar links having perforated ends, one link being placed between every two frogs and pivoted thereto by closely fitting pins passing through the perforated ends of the links and the perforated ears of the frogs, whereby an endless band is formed encircling the wheel, flexible only in the plane thereof, and seated in the groove between the tires.

3. A non-skid device for double tired wheels comprising a series of frogs hinged together to form an endless band encircling the wheel, flexible only in the plane of the wheel and seated in the groove between the tires, the laterally extending arms of said frogs extending across the treads of the tires and beyond the center lines thereof.

4. An anti-skidding chain for wheels having twin-tires, comprising a series of bars each extending transversely approximately to the centers of said tires, the inner face of each bar including curved portions conforming to and contacting with the surfaces of said tires, and the outer face presenting a substantially straight transversely extending cleat or ridge narrower than said inner face, and the side faces presenting lugs extending peripherally of the wheel and between the two tires thereof, and links secured to said lugs and connecting said bars together in series.

In testimony that I claim the foregoing as my invention, I have signed my name in presence of two subscribing witnesses.

ARNOLD BOSSHARD.

Witnesses:
 LOUIS TORG,
 ALBERT PHILLIPS.